(12) United States Patent
Palmieri

(10) Patent No.: US 8,875,696 B2
(45) Date of Patent: Nov. 4, 2014

(54) VACUUM SOLAR THERMAL PANEL WITH RADIATIVE SCREEN

(75) Inventor: Vittorio Palmieri, Geneva (CH)

(73) Assignee: TVP Solar SA, Geneva (CH)

( * ) Notice: Subject to any disclaimer, the term of this patent is extended or adjusted under 35 U.S.C. 154(b) by 653 days.

(21) Appl. No.: 13/120,565

(22) PCT Filed: Sep. 23, 2009

(86) PCT No.: PCT/IB2009/006944
§ 371 (c)(1),
(2), (4) Date: Mar. 23, 2011

(87) PCT Pub. No.: WO2010/035116
PCT Pub. Date: Apr. 1, 2010

(65) Prior Publication Data
US 2011/0174297 A1   Jul. 21, 2011

(30) Foreign Application Priority Data

Sep. 26, 2008 (IT) .............................. MI2008A1716

(51) Int. Cl.
*F24J 2/05* (2006.01)
*F24J 2/04* (2006.01)
*F24J 2/26* (2006.01)

(52) U.S. Cl.
CPC *F24J 2/05* (2013.01); *F24J 2/0494* (2013.01); *F24J 2/265* (2013.01); *Y02E 10/44* (2013.01)
USPC ............................. 126/653; 126/655; 126/657

(58) Field of Classification Search
CPC .............. F24J 2/0494; F24J 2/05; F24J 2/265
USPC .......................................... 126/653, 655, 657
See application file for complete search history.

(56) References Cited

U.S. PATENT DOCUMENTS

| | | | |
|---|---|---|---|
| 3,453,776 A * | 7/1969 | Clarke et al. ......................... 49/7 |
| 3,961,619 A * | 6/1976 | Estes et al. ..................... 126/666 |
| 3,974,822 A * | 8/1976 | Patil .............................. 126/708 |
| 4,172,311 A * | 10/1979 | Heyman ................... 29/890.033 |

(Continued)

FOREIGN PATENT DOCUMENTS

| | | |
|---|---|---|
| DE | 203 19 299 | 2/2004 |
| DE | 202 20 874 | 4/2004 |

(Continued)

OTHER PUBLICATIONS

International Search Report Issued Nov. 22, 2010 in PCT/IB09/006944 filed Sep. 23, 2009.

(Continued)

*Primary Examiner* — Avinash Savani
(74) *Attorney, Agent, or Firm* — Oblon, Spivak, McClelland, Maier & Neustadt, L.L.P.

(57) ABSTRACT

A double-sided vacuum thermal solar panel comprising a vacuum-tight envelope capable of withstanding atmospheric pressure when evacuated, the envelope comprising a first and a second glass plate transparent to solar radiation and facing each other, a perimeter frame defining the lateral surface of the envelope, the solar panel comprising at least one first heat absorber, a second heat absorber, a pipe which enters and exits the envelope by passing in between the first and second heat absorber, and a box-like element which surrounds the outer surface of the pipe.

10 Claims, 6 Drawing Sheets

(56) References Cited

U.S. PATENT DOCUMENTS

| | | | | |
|---|---|---|---|---|
| 4,240,407 A | * | 12/1980 | Spencer | 126/668 |
| 4,267,822 A | * | 5/1981 | Diamond | 126/587 |
| 4,284,069 A | * | 8/1981 | Horster et al. | 126/654 |
| 4,292,956 A | * | 10/1981 | Wasserman | 126/651 |
| 4,332,241 A | * | 6/1982 | Dalstein et al. | 126/711 |
| 4,333,448 A | * | 6/1982 | Johnson | 126/714 |
| 4,338,921 A | * | 7/1982 | Harder et al. | 126/659 |
| 4,359,042 A | * | 11/1982 | Belentepe et al. | 126/570 |
| 4,423,718 A | * | 1/1984 | Garrison | 126/655 |
| 4,517,961 A | * | 5/1985 | Bloor et al. | 126/622 |
| 4,716,882 A | * | 1/1988 | Ishida | 126/650 |
| 6,082,353 A | * | 7/2000 | van Doorn | 126/659 |
| 6,196,216 B1 | * | 3/2001 | Kooij | 126/651 |
| 7,810,490 B2 | * | 10/2010 | Liu et al. | 126/629 |
| 8,096,295 B1 | * | 1/2012 | Eyal | 126/643 |
| 2007/0039611 A1 | * | 2/2007 | Benvenuti | 126/652 |
| 2010/0006090 A1 | | 1/2010 | Palmieri | |
| 2010/0224183 A1 | * | 9/2010 | Rovira et al. | 126/653 |
| 2010/0313876 A1 | | 12/2010 | Palmieri | |
| 2011/0072662 A1 | | 3/2011 | Palmieri | |
| 2011/0155125 A1 | * | 6/2011 | Benvenuti | 126/653 |

FOREIGN PATENT DOCUMENTS

| | | |
|---|---|---|
| DE | 103 06 532 | 6/2004 |
| FR | 2 523 698 | 9/1983 |
| WO | 2005 075900 | 8/2005 |

OTHER PUBLICATIONS

U.S. Appl. No. 13/056,532, filed Jan. 28, 2011, Palmieri.

* cited by examiner

VACUUM SOLAR THERMAL PANEL WITH RADIATIVE SCREEN

The present invention relates to a double-sided vacuum thermal solar panel in accordance with the introduction to the main claim.

Double-sided vacuum thermal solar panels are realized to absorb solar radiation from two active surfaces, either receiving sunlight directly or reflected by a mirror. These are known for example from EP0387843, DE 103 06 532, DE 203 19 299 U1, EP 1 342 964, DE 202 20 874.

EP0387843 relates to solar panels that comprise a vacuum-tight envelope formed of two glass plates transparent to solar radiation. Within the envelope one or more heat absorbers are placed to absorb the solar radiation by converting it into thermal energy. The heat absorber is generally a rectangular metal sheet made of copper, aluminum or other metal of high heat conduction coefficient and low infrared emission coefficient, covered with a selective absorption coating highly absorbent for visible radiation but transparent to infrared radiation (for example chromium or nickel oxide). A pipe through which a thermo-vector fluid flows, generally water, enters and exits the envelope being in good contact with said heat absorbers, generally by means of a weld made along a generatrix of its outer surface. This weld is typically made by laser or ultrasound in order to minimize deformation of the metal sheet and damage to its coating. The thermal energy collected by the heat absorber is transmitted via said weld to the pipe by conduction, hence heating the fluid flowing through it.

Both sides of the double-sided solar panels receive the solar radiation. For this reason, in order to maximize performance, said selective absorption coating is also placed on the outer surface of the pipe, in contact with one side of the heat absorber. Such pipe normally also being made of copper to achieve low infrared emissivity.

Getter pumps are also positioned in vacuum panels, to absorb by a chemical effect any gas residues still present in the envelope after it has been evacuated, in order to maintain an adequate vacuum level for the entire operation period of the panel. These getter pumps normally consist of massive elements located within the vacuum envelope or of thin film coatings formed by the evaporation under vacuum of a flash getter on an inner surface of said envelope. However they can also be advantageously formed as thin film coatings placed on the surface of the heat absorbers under the selective absorption coating as described in EP1706678.

A problem of current double-sided vacuum solar panels is that arranging a thin getter film on an absorber surface under the selective absorption coating negatively modifies the properties of said coating, by reducing its visible light absorption while at the same time increasing the infrared emissivity of the absorber.

Another problem is that the infrared emissivity coefficient of a surface provided with a selective absorption coating depends on the constituent material of said surface and not of the coating itself. Consequently, to limit the thermal energy losses by pipe irradiation, it is preferably made of copper, a material presenting a low infrared emissivity, but which considerably increases the panel production costs, or limits the maximum operating pressure of the thermo-vector fluid.

A further problem is that the weld between the pipe and absorber requires care in positioning said components as the contact surface area is very small, particularly in the case of laser welding in which the transverse dimension of the weld seam is very small.

DE 103 06 532 shows a non vacuum solar heat collector panel comprising: a shallow box-like structure, and pipes enclosed in absorbers open on their lateral sides.

An object of the present invention is therefore to provide a solar panel which allows the said drawbacks to be overcome and in which thermal dispersion due both to irradiation and to conduction are limited.

A particular object is to provide a double-sided vacuum thermal solar panel comprising a getter pump which does not alter the absorption and reflection properties for the electromagnetic radiation of the heat absorbers.

A further object is to manufacture the thermo-vector fluid pipe in a material less expensive and more robust than copper, while at the same time limiting its infrared radiative losses.

Another object is to improve heat transfer between the heat absorber and the thermo-vector fluid flowing through the pipe, while at the same time facilitating their welding, particularly by laser technique.

Said objects are attained by a double-sided vacuum solar panel the inventive characteristics of which are defined in the claims.

The invention will be more apparent from the ensuing detailed description of one embodiment thereof, provided by way of non-limiting example and illustrated in the accompanying drawings, in which.

Figure 1:
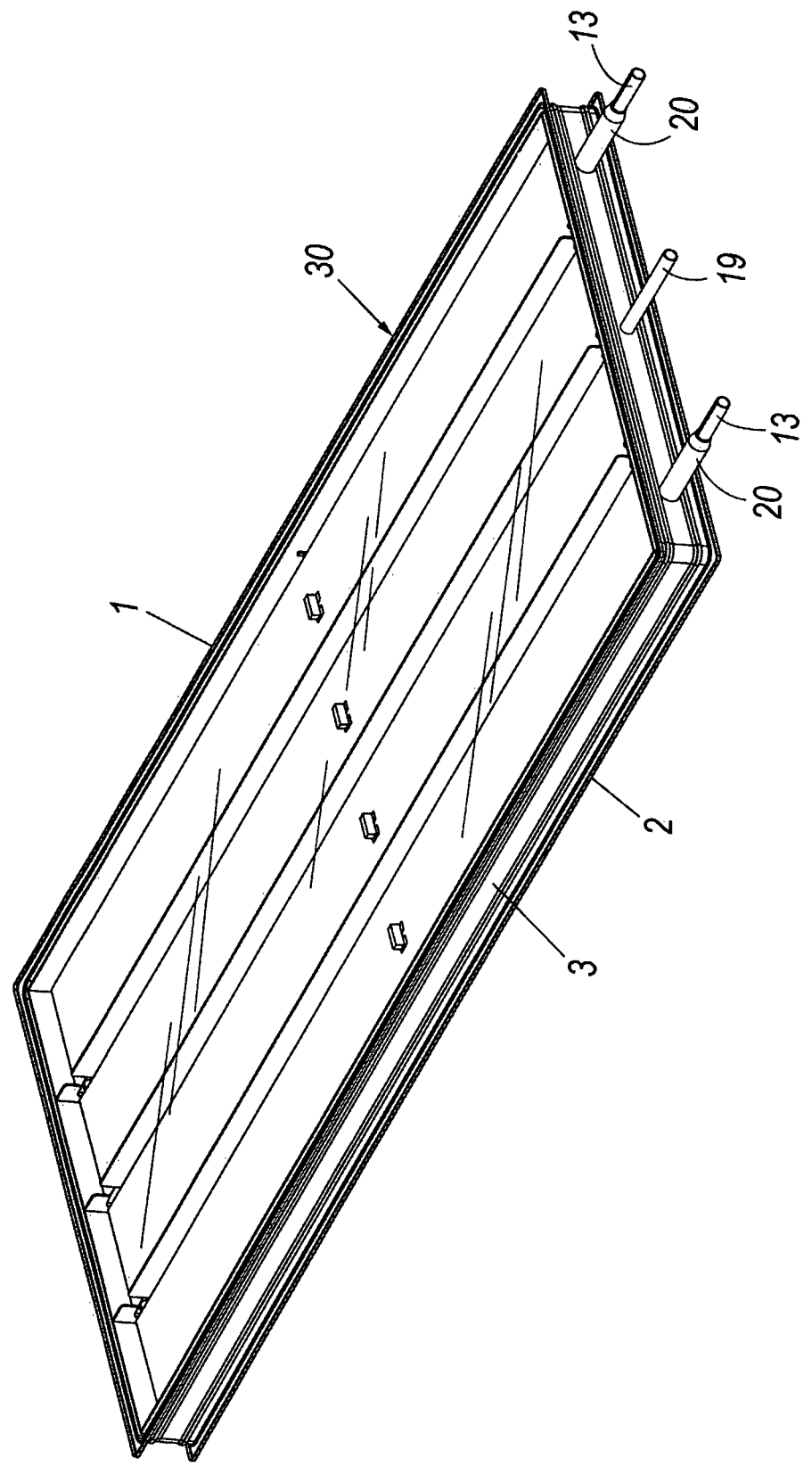
FIG. 1 is a perspective view of the solar panel according to the invention.

FIG. 1 shows a perspective view of the double-sided vacuum thermal solar panel. This solar panel comprises a vacuum-tight envelope 30 able to withstand atmospheric pressure when evacuated, comprising a first and a second mutually facing glass plate 1, 2 transparent to solar radiation. The first and second glass plate define the two active surfaces of the solar panel. Single-sided panels present a single glass plate, while a second plate facing the first can be made of metal. Double-sided panels present two facing glass plates to increase thermal energy production, and in which the second glass plate is traversed by solar radiation reflected by a mirror.

Figure 2:
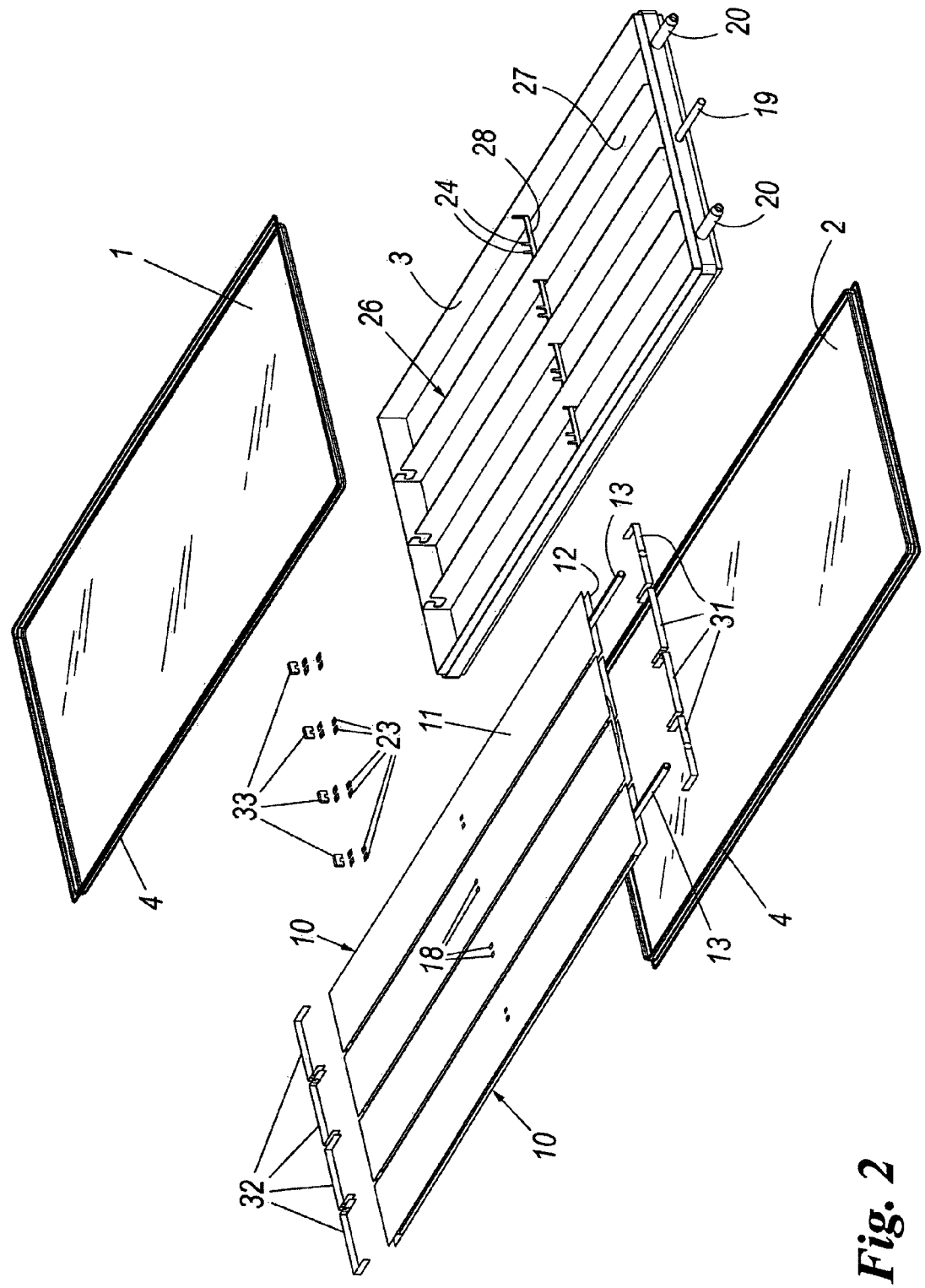
FIG. 2 is an exploded perspective view of the solar panel.

As can also be seen from the exploded view of FIG. 2, the vacuum-tight envelope 30 is delimited laterally by a perimeter metal frame 3. The perimeter frame 3 is joined to the glass plates 1, 2 by a flexible metal belt 4, 5 joined to the perimeter frame 3 by welding, brazing or soldering and to the glass plates 1, 2 by a glass-metal seal of bulk type, in which the edge of the metal belt is embedded in the glass in accordance with the patent MI2008A 001245.

The first heat absorbers 11 are placed within the envelope 30 to face the first glass plate 1 such as to receive and absorb solar radiation which, by means of the first glass plate 1, enters the envelope 30 directly. Second heat absorbers 12 are placed again inside said envelope 30 but facing the second glass plate 2 such as to receive and absorb solar radiation which enters the envelope 30 by means of the second glass plate 2. These heat absorbers 11, 12 are rectangular metal sheets with their surface parallel to the glass plates 1, 2. A selective coating, very absorbent towards visible light but transparent towards infrared, is placed on those surfaces of said heat absorbers 11, 12 facing the glass plates 1, 2.

These heat absorbers 11, 12 are preferably made of copper covered with a selective absorption coating, as copper presents a high thermal conductivity and a low infrared emission coefficient. In fact, the infrared emission by a selective absorption coating depends on the constituent metal of the surface, given that the selective absorption coating is transparent to infrared radiation. A coating transparent to visible light and reflective towards infrared is also disposed on that surface of the glass plates 1, 2 facing the heat absorbers 11, 12 within the envelope 30. In this manner the visible radiation originating from the sun passes through the glass plates with low attenuation, to reach the surfaces of the heat absorbers 11, 12 where it is absorbed and transformed into thermal energy thereby, while at the same time the infrared irradiation of the heat absorbers, already very limited by the fact that these absorbers are made of copper and are covered by an infrared-transparent selective coating, is largely reflected by the coating placed on the surface of the glass plates 1, 2 internal to the envelope which is transparent to visible light but reflective to infrared, so further reducing losses towards the outside.

Figure 3:
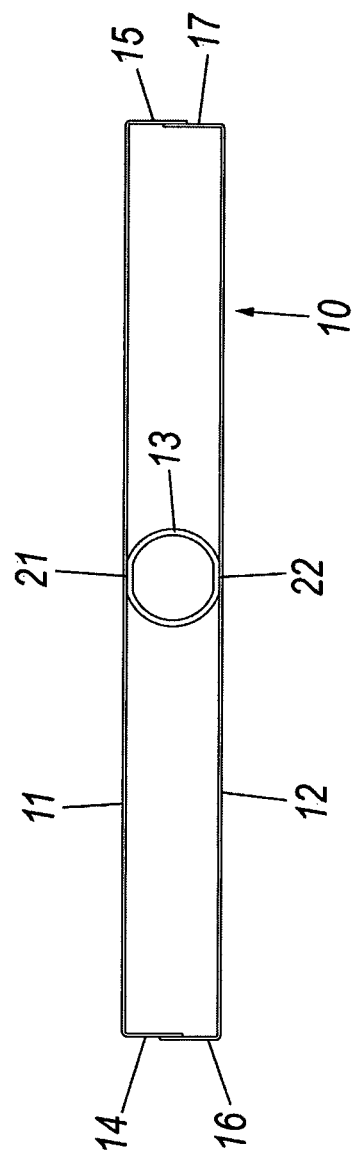
FIG. 3 is a cross-section through the solar panel according to the invention.
Figure 4:
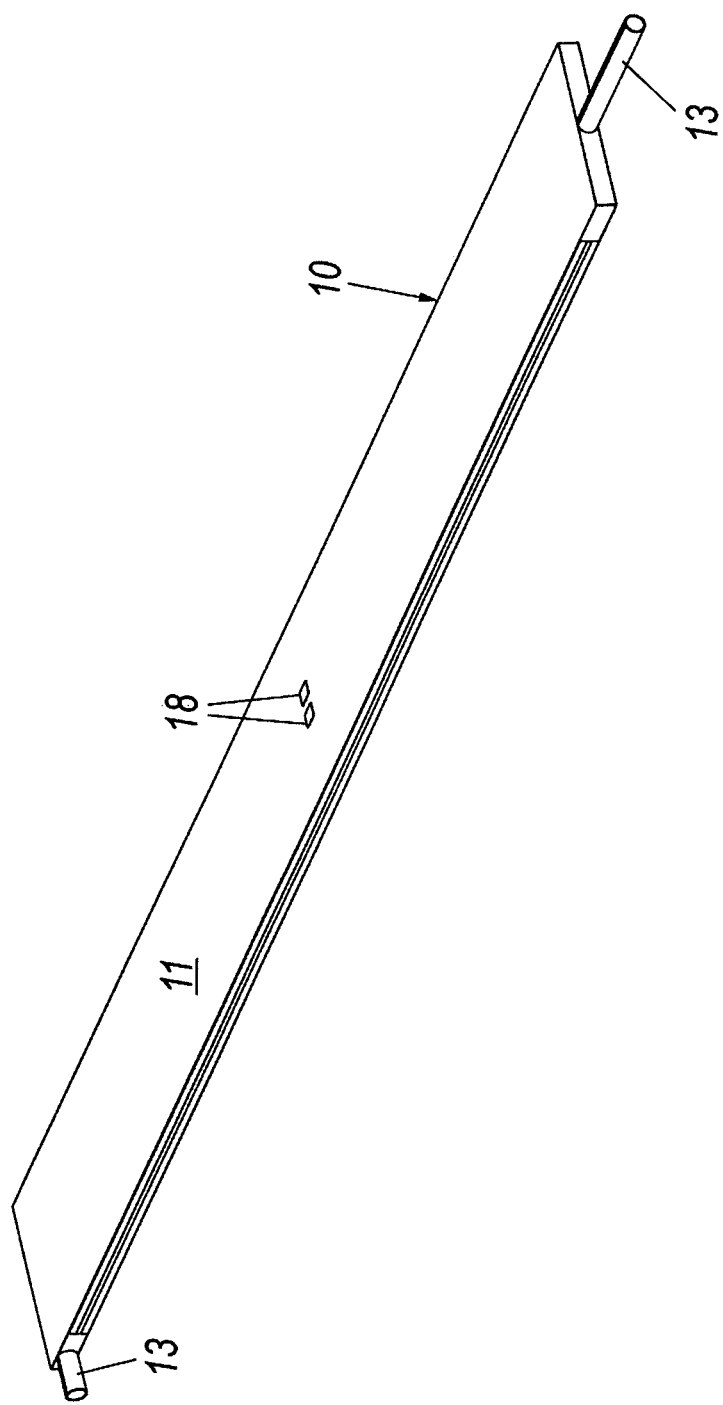
FIG. 4 is a perspective view of a box-like element traversed by the thermo-vector fluid transport pipe.

One side of the perimeter frame is provided with two exit ports 20, provided such as to enable a pipe 13 to enter and exit the vacuum-tight envelope 30 with minimum heat transfer losses due to conduction, and a pumping port 19 for evacuating said envelope 30. The pipe 13 enters and exits said envelope 30 by passing between said first and second heat absorbers 11, 12 and serves for transporting the thermo-vector fluid, generally water, which has to be heated in passing through the solar panel envelope 30. The outer surface of the pipe 13 is in contact with the first and second heat absorber 11, 12, which are generally welded along two opposing generatrices of the outer surface of the pipe 13, such as to create good thermal contact between the heat absorbers 11, 12 and the pipe 13, for easy thermal energy transfer by conduction from the absorbers 11, 12 to the pipe 13 and to the fluid flowing through it. To increase the contact surface while at the same time facilitating welding and improving thermal conductivity between the heat absorbers 11, 12 and the pipe 13, the pipe 13 can advantageously be of flattened shape at its centre, to form a flat contact surface 21, 22 with each of the heat absorbers 11, 12 (FIG. 3). This flat contact surface 21, 22 allows easier welding between the pipe 13 and the heat absorbers 11 and 12. It also allows better heat transmission between the heat absorbers 11, 12 and the pipe 13.

To limit dispersions by irradiation between the pipe 13 and the perimeter frame 3, which is at a lower temperature, the solar panel comprises box-like elements 10 surrounding the outer surface of the pipe 13, to form a radiative screen for the infrared radiation exiting it. The pipe 13, which generally after entering the envelope 30 is bent to form a serpentine coil, enters and exits said box-like elements 10. In this manner the pipe 13, by passing within the box-like elements 10 which screen its radiative emission, can be made of materials other than copper, such as aluminum, which is decidedly less expensive, even if having a much higher infrared emission coefficient, in particular at high temperature.

Said box-like elements 10 define an optically closed volume around the outer lateral surface of the pipe 13 and comprise said first and second heat absorbers 11, 12 with their edges 14, 15, 16, 17 bent to surround the outer lateral surface of the pipe 13, and a first and second plug 31, 32 for optically closing the base ends of the box-like element 10. In FIG. 2 it can be seen that these plugs 31 and 32 extend to also screen laterally the pipe 13. The edges 14, 15, 16, 17 of the heat absorbers 11, 12 are bent to obtain a substantially "C" cross-section for each individual heat absorber 11, 12 (FIG. 3). In this manner a first and second heat absorber 11, 12 together form the lateral surface of the box-like element 10. The edges 14, 15, 16, 17 of the first and second heat absorber 11, 12 are optically overlapping relative to the outer surface of the pipe 13 to capture the thermal radiation emitted laterally by said pipe 13. An edge of each heat absorber could also be bent to provide the heat absorber with an "L" cross-section. Two coupled heat absorbers of "L" cross-section could form the lateral surface of the box-like element. The box-like element 10 could present a lateral surface surrounding the pipe 13, but be open at the base ends due to the absence of the plugs 31 and 32. This would worsen the radiative loss, but could be justified by lower production costs for the solar panel. The getter pump formed by thin film coating is placed on the inner surface of said box-like element 10, hence not interfering with the properties of the selective absorption coating placed-instead on the outer surface. Bulk getter pumps of different type could also be inserted into the box-like element 10, for example in the form of pills or strips, which are placed in contact with the inner surface of said box-like elements. Finally a flash getter can be evaporated onto the inner surface of the box-like element 10 by applying energy in the form of electromagnetic waves, so as to be deposited on the inner surface of the box-like element 10 following a command originating from the outside. None of these getter pumps interferes with the electromagnetic radiation absorption and emission properties of the heat absorbers 11, 12 as these are all placed within the box-like element 10.

The envelope 30 is supported by a support frame 26 comprising longitudinal elements 27 and a transverse element 28. Said longitudinal elements 27 and transverse element 28 also serve to support the pipe 13 which forms a serpentine coil within said envelope. Several parallel pipes could also enter and exit the envelope 30 without forming a serpentine coil, in which case several exit ports 20 would be present.

Figure 5:
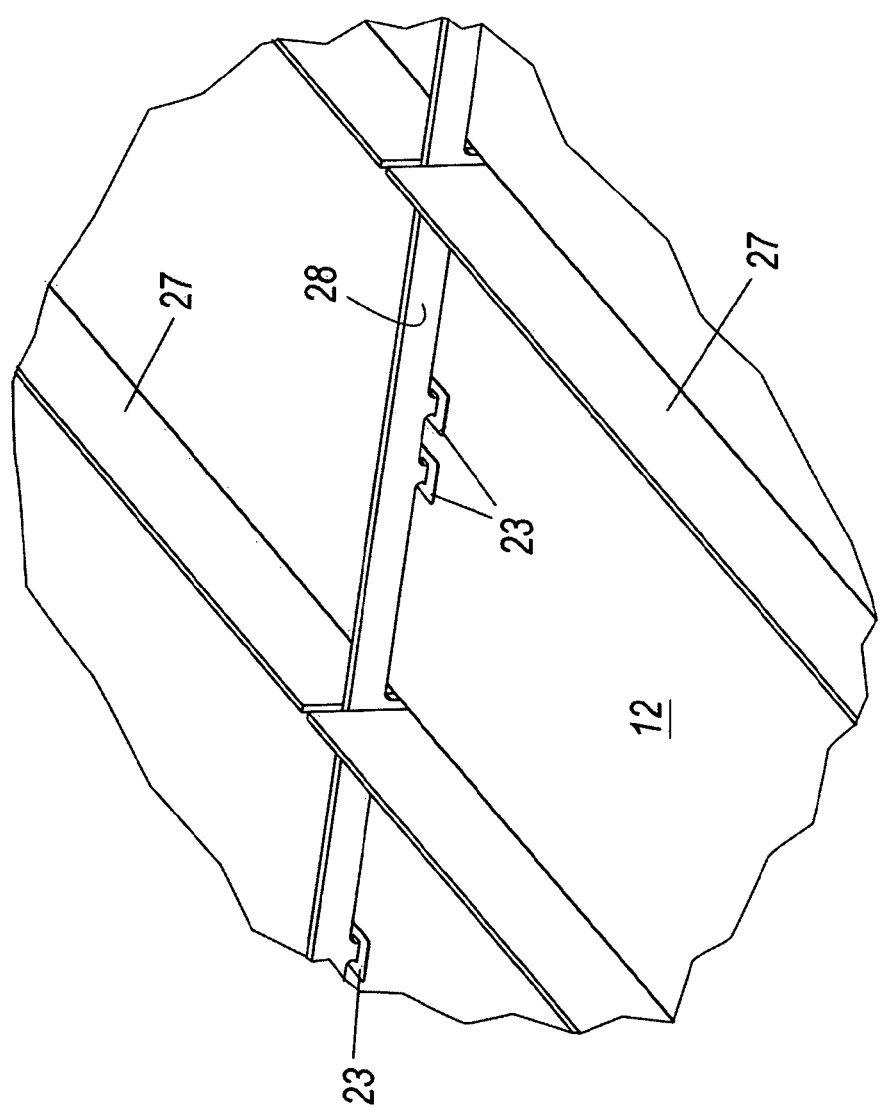
FIG. 5 is a perspective view of a part of the second heat absorber with the transverse support element and the screening plates.
Figure 6:
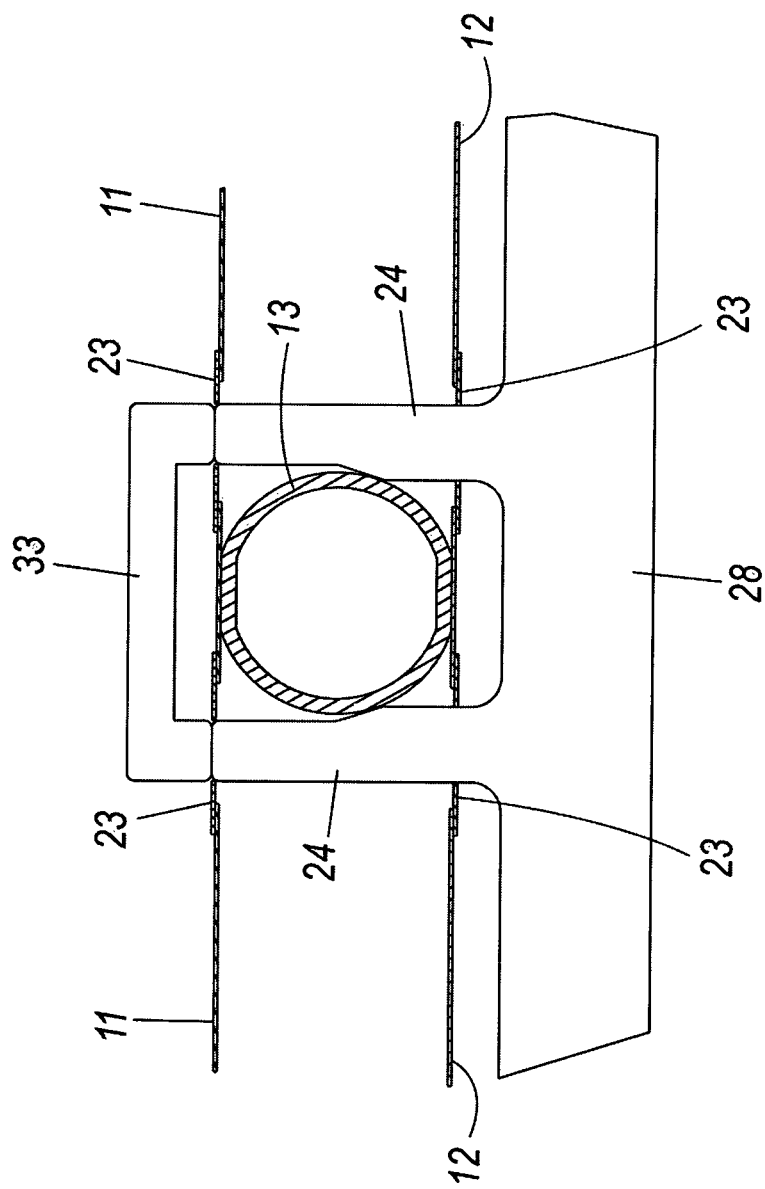
FIG. 6 is a cross-section through the solar panel at the transverse support element.

FIGS. 5 and 6 show that the heat absorbers 11 and 12 present holes 18 through which the supports 24 for the pipe 13 pass without contacting the absorbers 11 and 12 and that locking pieces 33 are fixed by screws to the ends of these supports 24. These holes 18 are closed by copper plates 23 fixed to the supports 24 of the pipe 13, to screen the infrared radiation leaving the interior of the box-like elements 10 through said holes 18. The absence of these plates 23 would worsen the efficiency of the solar panel overall, as the holes 18, although small, have the emissivity of a black body, equal to about twenty times that of a good selective coating placed-on a copper surface.

During operation the solar panel according to the invention receives solar radiation, which passes through the glass plates 1 and 2, is absorbed by the surface of the heat absorbers 11, 12 covered by the selective coating, and is transformed into thermal energy. This thermal energy is transferred to the pipe 13 mainly by conduction and then to the thermo-vector fluid within the pipe 13 by convection. Convection losses from the absorbers and pipe towards the outer walls of the envelope 30 are suppressed by the vacuum established in the envelope 30, while irradiation losses from the pipe 13 are strongly limited by the box-like elements 10 which surround the various serpentine coil portions formed by the pipe 13 to act as radiative screens for it. The high vacuum within the envelope 30 is maintained in time by the getter pump placed within the box-like element 10.

One of the advantages of the solar panel according to the invention is that the getter pump placed within the box-like element does not alter the infrared emission properties of the heat absorbers, so enabling the selective absorption coating to be used effectively to optimise solar radiation absorption.

Another advantage is that the radiation losses from the pipe are strongly limited by the presence of the box-like elements surrounding it to form a radiation screen for the same. This enables the pipe 13, used to transport the thermo-vector fluid, to be made of a material less expensive than copper, for example aluminum, while still limiting radiation losses.

The flat contact surfaces 21, 22 of the pipe 13 enable the contact surface between the pipe 12 and the heat absorbers 11, 12 to be increased, so improving heat transfer to the thermo-vector fluid flowing through the pipe and at the same time facilitating its welding by laser technique.

Another advantage is that the box-like element can be easily and economically produced by bending the edges of the heat absorbers to form a "C" shape.

The invention claimed is:

1. A double-sided vacuum thermal solar panel comprising:
   a vacuum-tight envelope capable of withstanding atmospheric pressure when evacuated, said envelope including a first and a second glass plate transparent to solar radiation and facing each other to define the two active surfaces of the solar panel, a perimeter frame defining a lateral surface of said envelope, said perimeter frame provided with two exit ports and a pumping port;
   at least one first heat absorber placed inside said envelope and able to receive solar radiation through the first glass plate;
   a second heat absorber placed inside said envelope and able to receive solar radiation through the second glass plate;
   a pipe which enters and exits said envelope by passing in between said first and second heat absorber and presenting an outer surface in contact with said first and second heat absorber;
   a support frame for supporting said first and a second glass plates of said envelope,
   and said pipe, the support frame including longitudinal elements and transverse elements; and a box-like element provided inside said envelope and said support frame, wherein said box-like element completely surrounds the outer surface of the pipe positioned within the box-like element such that all sides of the pipe are enclosed by the box-like element to thereby form a radiation screen for irradiation between the pipe and the perimeter frame,
   wherein said box-like element is supported only by the pipe, and wherein said box-like element is a metal box distinct and thermally isolated from said perimeter frame and said support frame, to limit dispersion by irradiation between the pipe and said peripheral frame and support frame.

2. A double-sided vacuum thermal solar panel according to claim 1, wherein said box-like element presents a lateral surface comprising said first and second heat absorber.

3. A double-sided vacuum thermal solar panel according to claim 1, wherein said box-like element defines a volume which is optically closed about at least a portion of the outer surface of the pipe.

4. A double-sided vacuum thermal solar panel according to claim 1, wherein said box-like element presents a parallelepiped shape, and comprises:
   an upper and a lower base element,
   two lateral wall elements,
   two base ends comprising a first and second plug,
   said box like element being completely optically closed,
   wherein said upper and lower base elements, two lateral wall elements and base ends are distinct and thermally isolated elements with respect to said perimeter frame and said support frame.

5. A double-sided vacuum thermal solar panel according to claim 1, wherein said heat absorbers have edges which are bent such as to define a substantially C-shaped cross section for each heat absorber.

6. A double-sided vacuum thermal solar panel according to claim 1, wherein the edges of the first and second heat absorber are optically overlapping with respect to the outer surface of the pipe.

7. A double-sided vacuum thermal solar panel according to claim 1, wherein said pipe presents on its outer surface a flat surface of contact with a heat absorber.

8. A double-sided vacuum thermal solar panel according to claim 1, further comprising: a getter pump placed inside said box-like element.

9. A double-sided vacuum thermal solar panel according to claim 1, wherein the box-like element presents holes for the passage of supports adapted to support the pipe, said solar panel comprising small plates able to shield the infrared radiation leaving from the holes, said holes being provided in a lower and in an upper wall of the box like elements, said lower and upper walls being parallel to the first and second glass plates of the envelope.

10. A double-sided vacuum thermal solar panel according to claim 1, wherein said pipe for transporting a thermo-vector fluid is made of materials other than copper, having a higher infrared emission coefficient.

* * * * *